United States Patent
Ito

(10) Patent No.: US 9,573,618 B2
(45) Date of Patent: Feb. 21, 2017

(54) BALL SCREW AND STEERING APPARATUS

(71) Applicant: Showa Corporation, Gyoda-shi (JP)

(72) Inventor: Ryota Ito, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/861,426

(22) Filed: Sep. 22, 2015

(65) Prior Publication Data
US 2016/0207566 A1    Jul. 21, 2016

(30) Foreign Application Priority Data

Jan. 19, 2015    (JP) .................................. 2015-007330

(51) Int. Cl.
*B62D 5/04* (2006.01)
*F16H 25/22* (2006.01)

(52) U.S. Cl.
CPC ......... *B62D 5/0448* (2013.01); *F16H 25/2219* (2013.01)

(58) Field of Classification Search
CPC . B62D 5/0448; F16H 25/2214; F16H 25/2219
See application file for complete search history.

(56) References Cited

U.S. PATENT DOCUMENTS

| 2015/0151780 A1* | 6/2015 | Fujita | F16H 25/2219 74/424.87 |
| 2015/0239493 A1* | 8/2015 | Ito | F16H 25/2219 180/444 |

FOREIGN PATENT DOCUMENTS

| JP | 2012-154437 A | 8/2012 |
| JP | 2015-105710 A | 6/2015 |

* cited by examiner

*Primary Examiner* — Kevin Hurley
(74) *Attorney, Agent, or Firm* — Leason Ellis LLP

(57) ABSTRACT

A ball screw includes a nut, a screw shaft, an end deflector attached to the nut, plural balls, and a pair of ball lifting portions. A spiral groove is formed at an outer peripheral surface in the screw shaft. The plural balls roll along the spiral groove. The pair of ball lifting portions is provided at the end deflector so as to interpose a width center of the spiral groove. The pair of ball lifting portions supports the balls by a first part of one of the pair of ball lifting portions and a second part of other of the pair of ball lifting portions being apart from each other in a width direction of the spiral groove so as to interpose the width center of the spiral groove between the first and second parts to thereby lift the balls from the spiral groove.

8 Claims, 9 Drawing Sheets

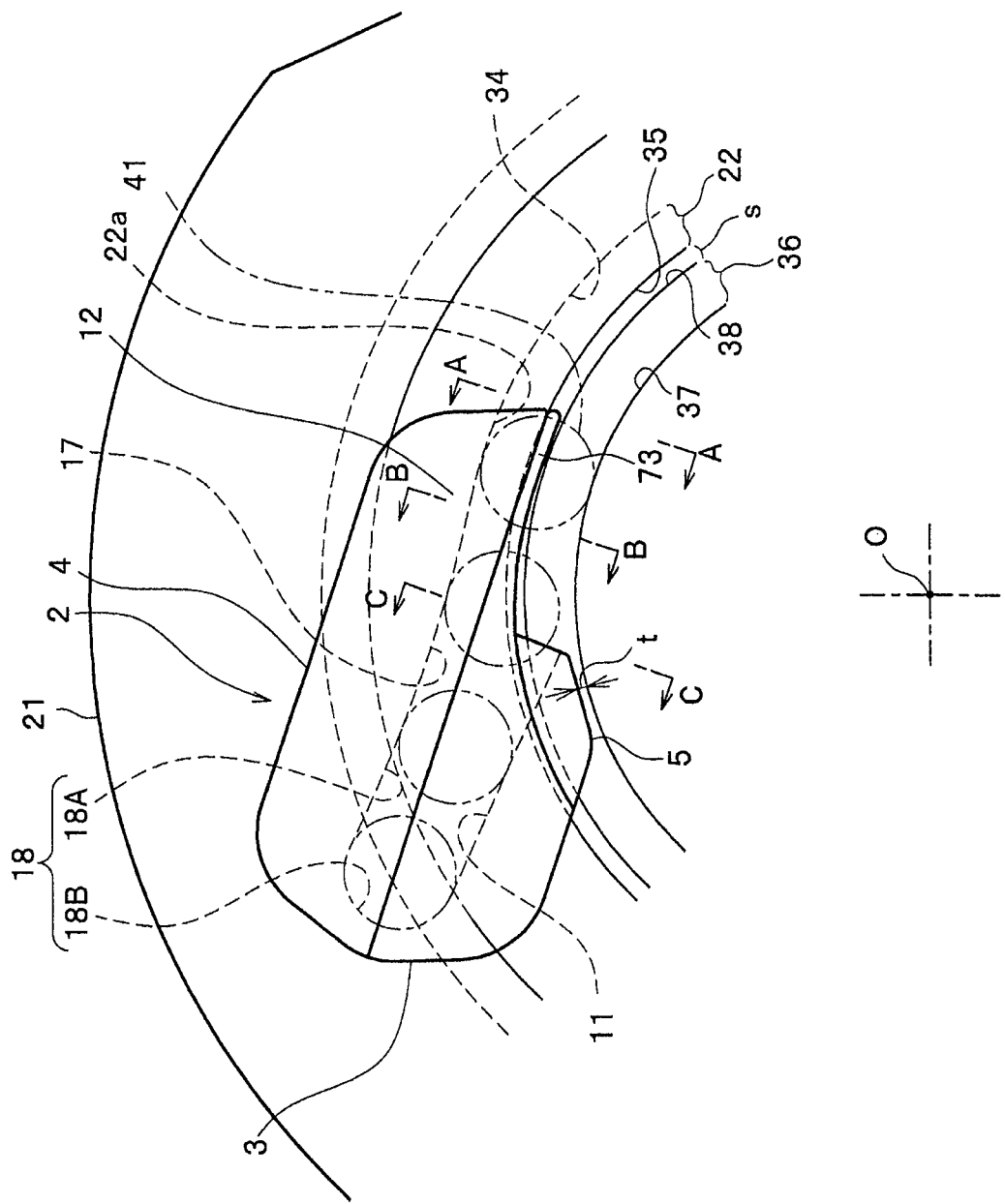

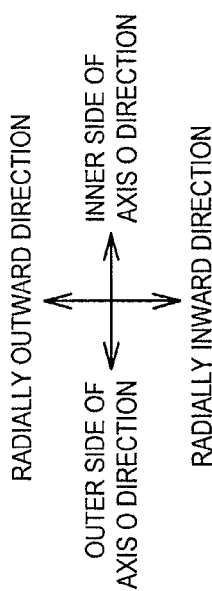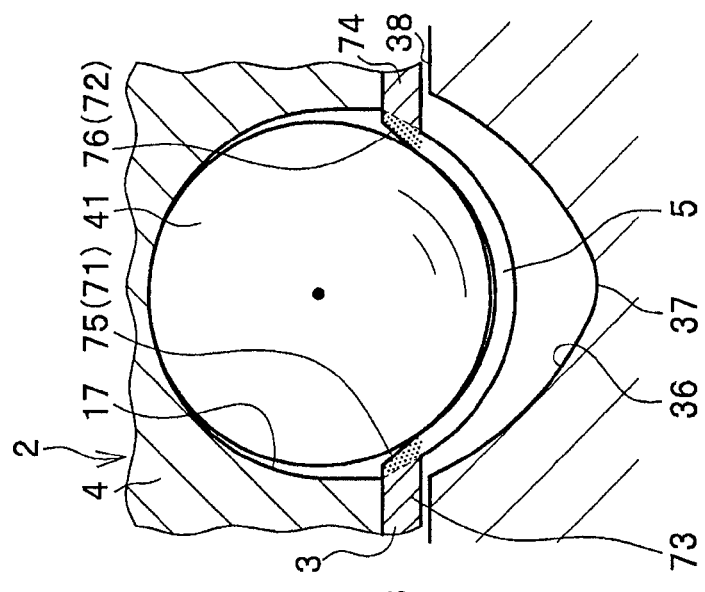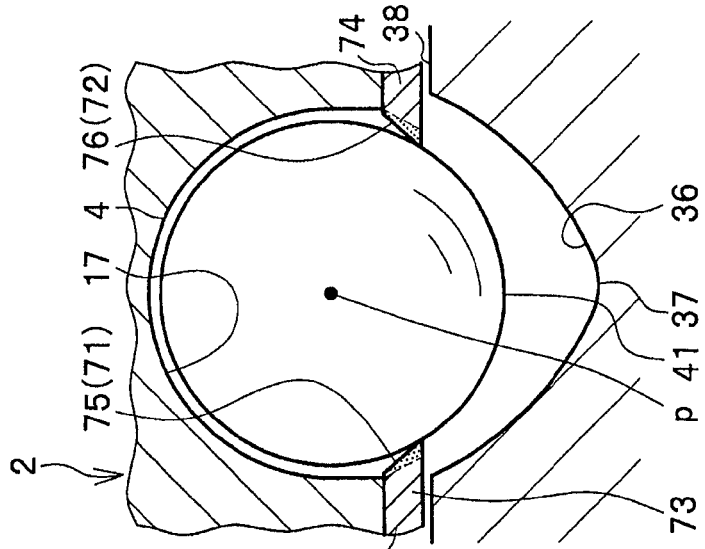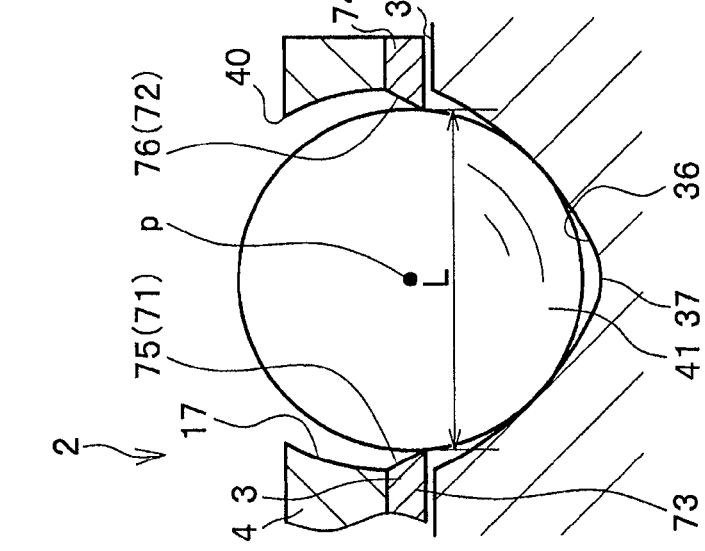
FIG. 8A  FIG. 8B  FIG. 8C

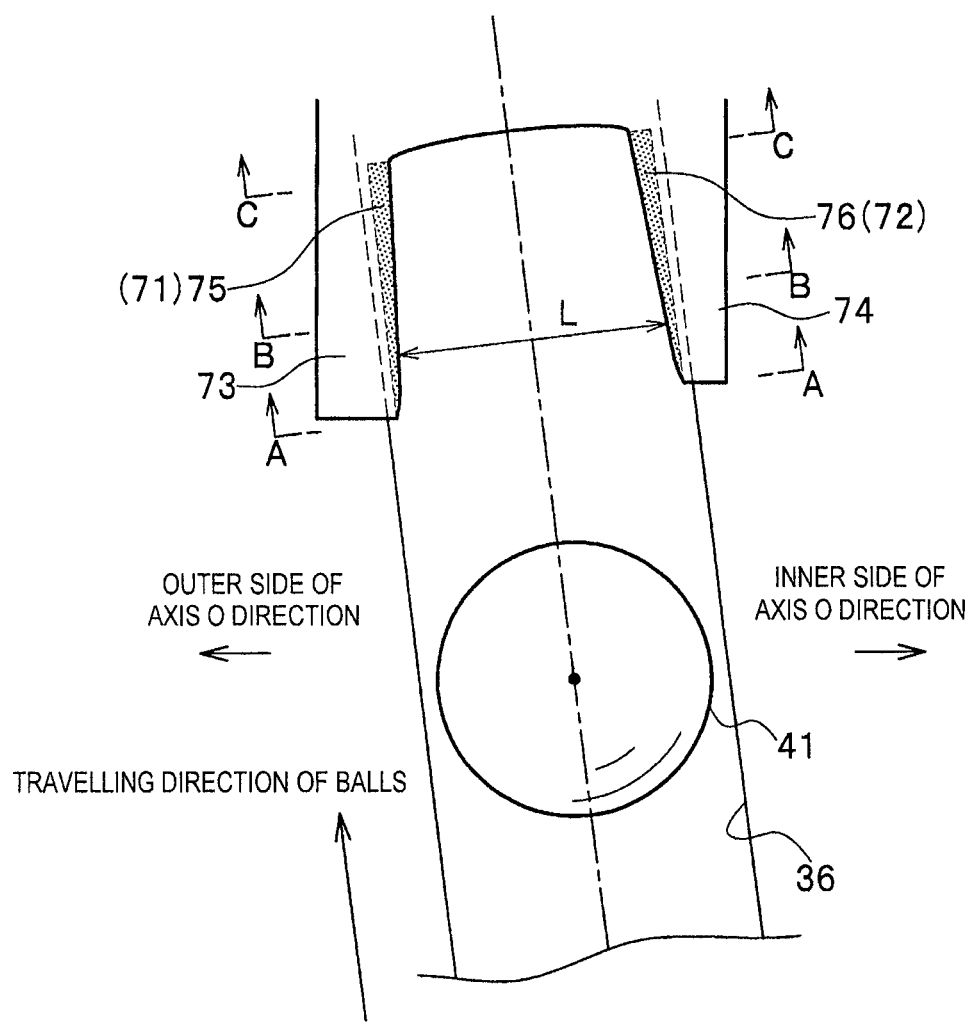

BALL SCREW AND STEERING APPARATUS

CROSS-REFERENCE TO RELATED APPLICATIONS

This application is based on and claims priority under 35 USC 119 from Japanese Patent Application No. 2015-007330 filed on Jan. 19, 2015, the entire content of which is incorporated herein by reference.

BACKGROUND OF THE INVENTION

1. Field of the Invention

The present invention relates to a ball screw and a steering apparatus.

2. Description of Related Art

As one of circulation systems of a ball screw, a system using an end deflector is known. In this system, a circulation path in which balls are circulated is formed in a nut. The end deflectors having a function of guiding the balls from the nut and a spiral groove of a screw shaft to the circulation path or returning the balls from the circulation path to the spiral groove are attached to both ends of the nut (refer to JP-A-2012-154437 (Patent Document 1)). The end deflector has a hook portion protruding in the spiral groove of the screw shaft for scooping the balls into the end deflector.

SUMMARY OF THE INVENTION

In Patent Document 1, as the screw shaft is a movable body, a gap is provided between the hook portion and the spiral groove of the screw shaft for preventing interference between the hook portion and the screw shaft. That is, a step is formed between the hook portion and the spiral groove of the screw shaft, therefore, there has been a problem that collision noise tends to be generated when balls passing through the spiral groove of the screw shaft abut on the step.

The present invention has been made for solving the above problem, and an object thereof is to provide a ball screw and a steering apparatus capable of suppressing collision noise generated by the end deflector and the balls when the balls enter from the spiral groove of the screw shaft to the end deflector.

According to an embodiment of the present invention, there is provided a ball screw including a nut; a screw shaft at which a spiral groove is formed at an outer peripheral surface of the screw shaft; an end deflector attached to the nut; plural balls rolling along the spiral groove; and a pair of ball lifting portions provided at the end deflector so as to interpose a width center of the spiral groove between the pair of ball lifting portions, in which the pair of ball lifting portions support the balls by a first part of one of the pair of ball lifting portions and a second part of other of the pair of ball lifting portions being apart from each other in a width direction of the spiral groove so as to interpose the width center of the spiral groove between the first and second parts to thereby lift the balls from the spiral groove.

In the above ball screw, the impact at the time of abutting on the ball lifting portions is dispersed to two parts. Therefore, even when the collision noise is generated at the time of abutting on the ball lifting portions, the collision noise will be lower than that to be generated at the time of abutting on the hook portion in related art. As the ball lifting portions are positioned at approximately 180 degrees opposite positions so as to interpose the center of the ball, a bound behavior of the ball occurring when abutting on the ball lifting portion can be suppressed.

When the pair of ball lifting portions is positioned outward in a radial direction of the screw shaft with respect to a mountain part of the spiral groove of the screw shaft, it is not necessary to consider the contact with respect to the screw shaft at the time of lifting the ball, therefore, a collision angle of the ball lifting portions with respect to the balls can be set to be smaller, which can further suppress the collision noise.

When the pair of ball lifting portions is formed by a pair of inclined surfaces, each of which is inclined to a width center side of the spiral groove as each of which goes to a radially inward direction of the screw shaft and which are provided so that a separation distance between the inclined surfaces is narrowed as the inclined surfaces go toward a travelling direction of the balls, the structure of the ball lifting portions can be simplified and the balls can be smoothly lifted.

When the end deflector is formed to be divided into a first member provided with a passage having a semicircular shape in cross section communicating with the spiral groove of the screw shaft and a second member provided with a passage having a semicircular shape in cross section communicating with a spiral groove of the nut, the first member may have a pair of thin plate portions extending along the travelling direction of balls between the second member and the mountain part of the screw shaft and provided apart from each other in the width direction of the spiral groove so as to interpose the width center of the spiral groove of the screw shaft, and the inclined surfaces can be formed on side surfaces of the respective thin plate portions facing each other.

According to the embodiment of the present invention, there is provided a steering apparatus including the ball screw, a motor rotating the nut and a steered shaft moving with a screw shaft and turning steered wheels.

In the above steering apparatus, the collision noise generated by the end deflector and balls when the balls enter into the end deflector from the spiral groove of the screw shaft can be suppressed.

According to the present invention, it is possible to suppress the collision noise generated by the end deflector and balls when the balls enter into the end deflector from the spiral groove of the screw shaft.

BRIEF DESCRIPTION OF THE DRAWINGS

FIG. 6 is a plan explanatory view of the nut and the end deflector seen from an axial direction of the screw shaft;

FIGS. 8A, 8B and 8C are operation cross-sectional views showing a state where the balls are lifted by ball lifting portions; and FIG. 9 is an explanatory view which is two-dimensionally developed when seeing the spiral groove of the screw shaft from a radially outward direction.

DESCRIPTION OF EMBODIMENTS

Figure 1:
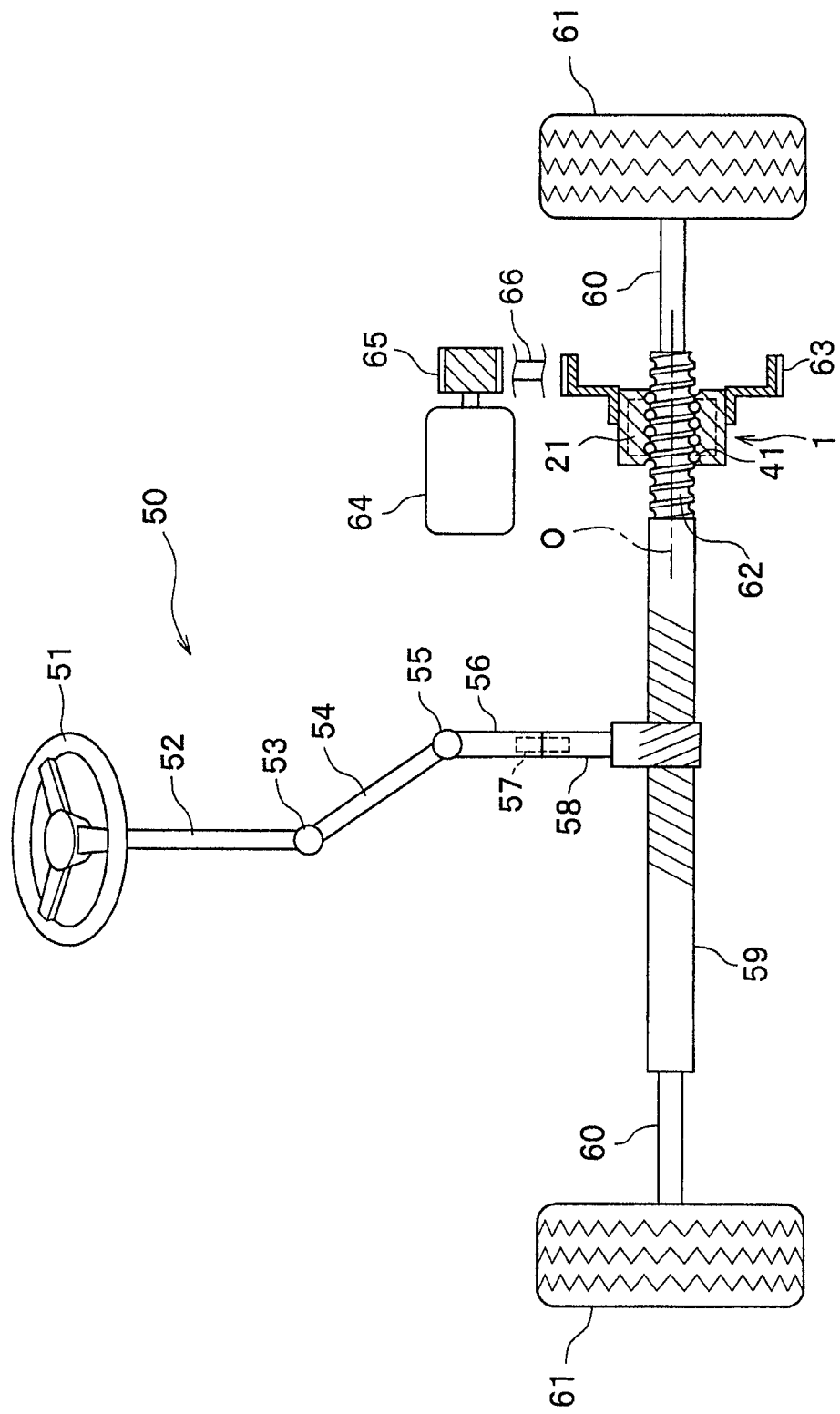
FIG. 1 is a schematic structure view showing an example of a steering apparatus.

A ball screw 1 according to the present invention is used for, for example, a rack-assist type power steering apparatus 50 as shown in FIG. 1. The power steering apparatus 50 as an example includes a steering wheel 51 operated by a driver, a steering shaft 52 integrally connected to the steering wheel 51, an upper connecting shaft 54 connected to the steering shaft 52 through a universal coupling 53, a lower connecting shaft 56 connected to the upper connecting shaft 54 through a universal coupling 55, a pinion shaft 58 connected to the lower connecting shaft 56 through a torsion bar 57, in which a pinion is formed at a lower part and a rack shaft 59 provided with rack teeth to be engaged with the pinion, to which right and left front wheels 61 are connected to both ends through tie rods 60. The rack shaft 59 operates as a steered shaft for turning wheels.

A screw shaft 62 is mounted between the rack shaft 59 and one tie rod 60 so as to be integral with the rack shaft 59, and the ball screw 1 is mounted to the screw shaft 62. A driven pulley 63 is pivotably attached to an outer periphery of a nut 21 of the ball screw 1, and a transmission belt 66 is stretched between a drive pulley 65 pivotably attached to an output shaft of an electric motor 64 for assistance and the driven pulley 63.

In the power steering apparatus 50 having the above structure, a torque added to the steering wheel 51 is detected by a not-shown torque sensor, and the motor 64 is controlled to be driven by a not-shown controller in accordance with the detected torque. Accordingly, the generated toque of the motor 64 is transmitted to the rack shaft 59 as an assisting force for an operating force added to the steering wheel 51 by the driver through a belt transmission mechanism including the drive pulley 65, the transmission belt 66 and the driven pulley 63 and through the ball screw 1.

Note that the ball screw 1 according to the present invention can be also used for a so-called steer-by-wire system steering apparatus in which a reaction force actuator giving an operation feeling to the driver at the time of operating the steering wheel is electrically connected to a steering actuator having a motor which drives the steered shaft.

Figure 2:
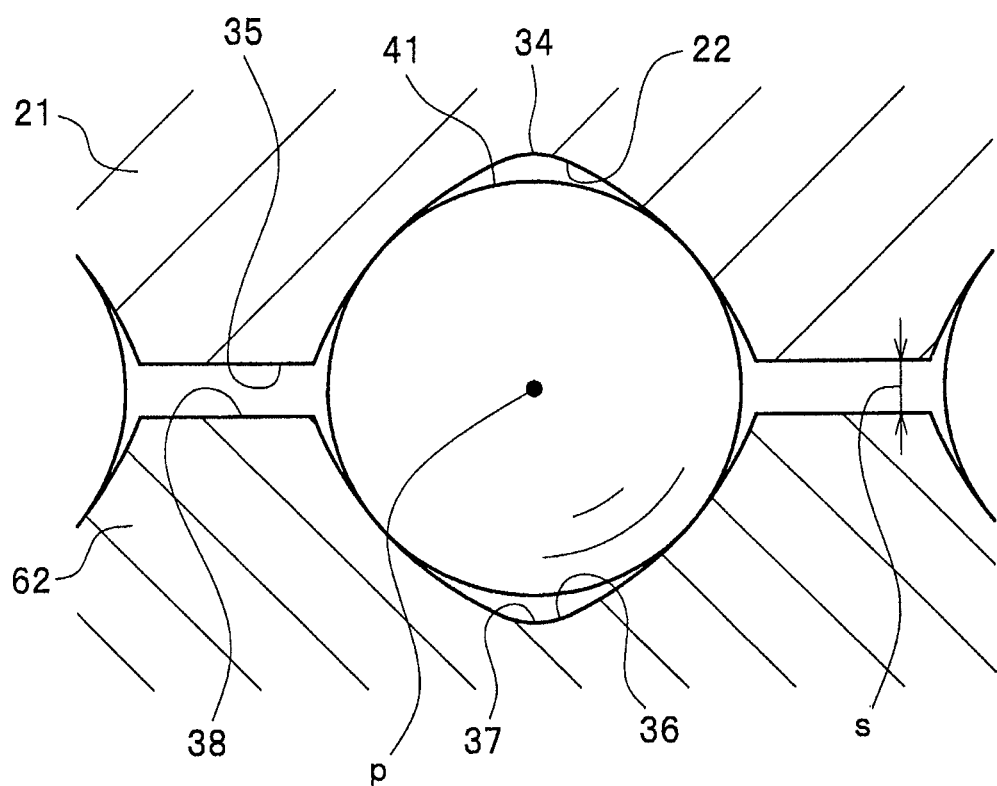
FIG. 2 is a cross sectional view showing a spiral groove of a nut and a spiral groove of a screw shaft.
Figure 3:
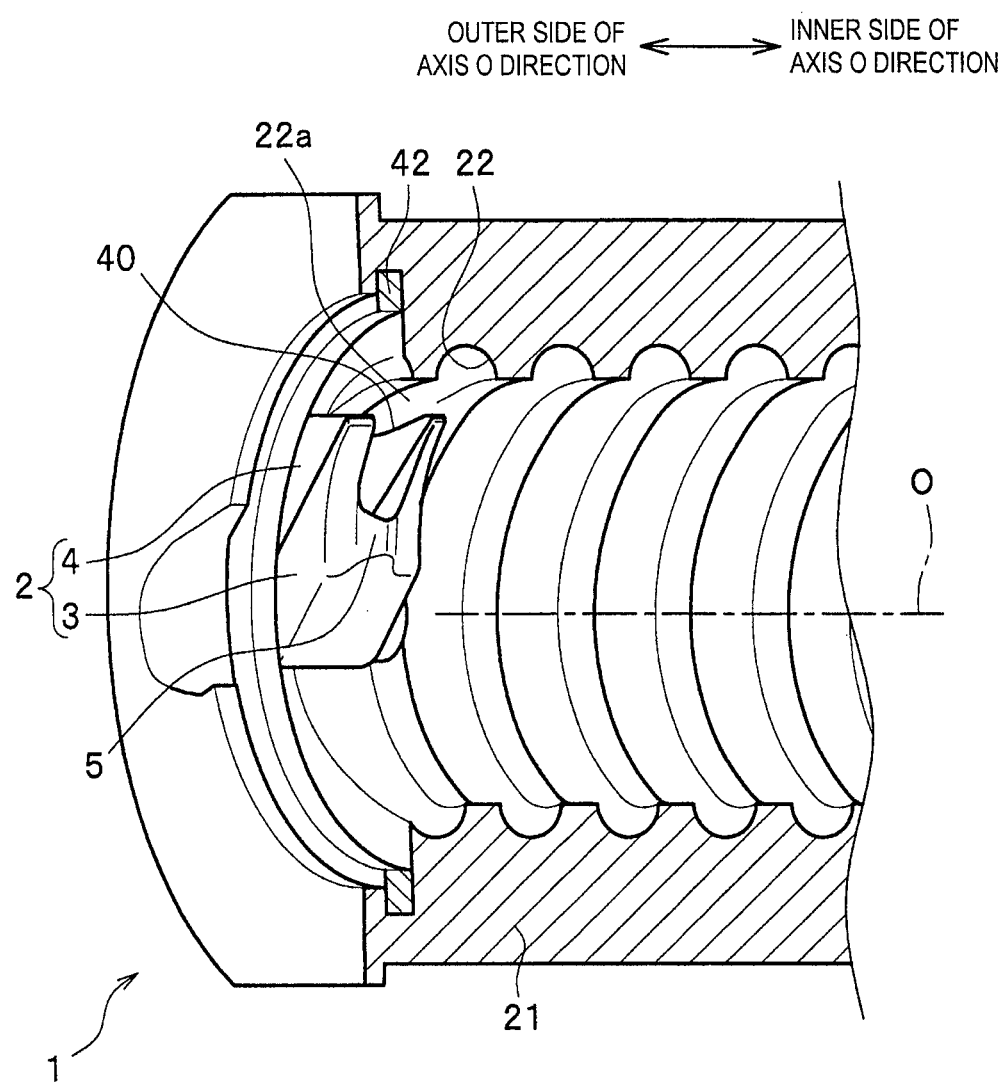
FIG. 3 is an outside view of a ball screw according to the present invention, showing a state where an end deflector is assembled to the nut (the screw shaft is not shown)
Figure 4:
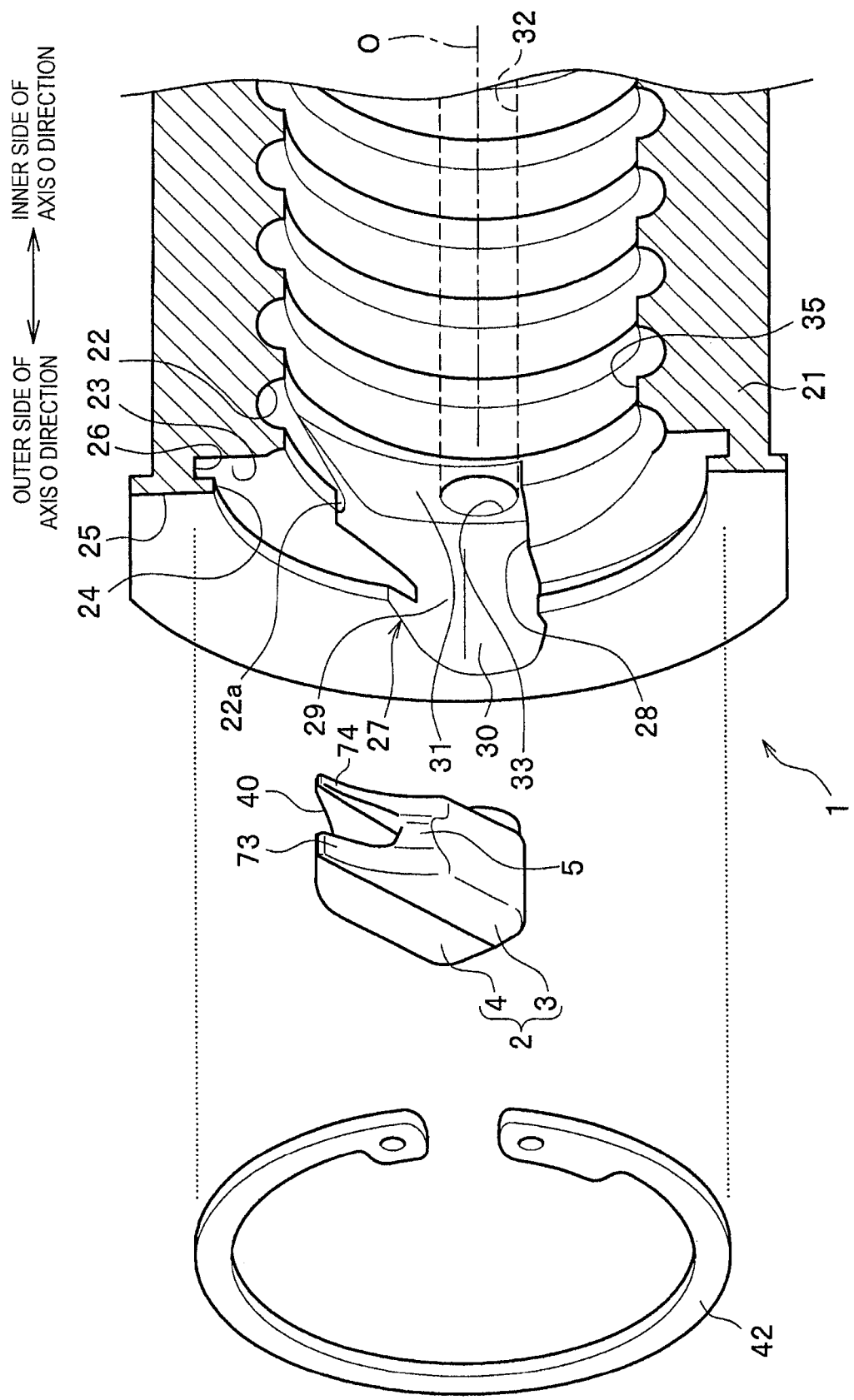
FIG. 4 is an outside view of the ball screw according to the present invention, showing a state before the end deflector is assemble to the nut (the screw shaft is not shown)
Figure 5A:
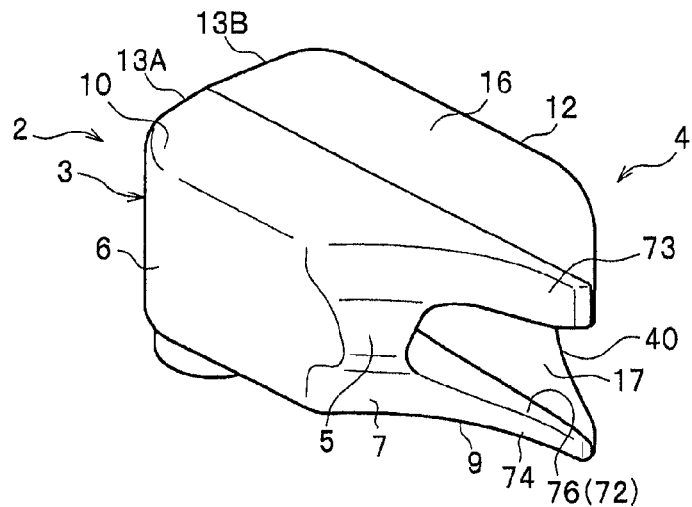
FIG. 5A is a perspective view showing a state where a first member and a second member are assembled.
Figure 5B:
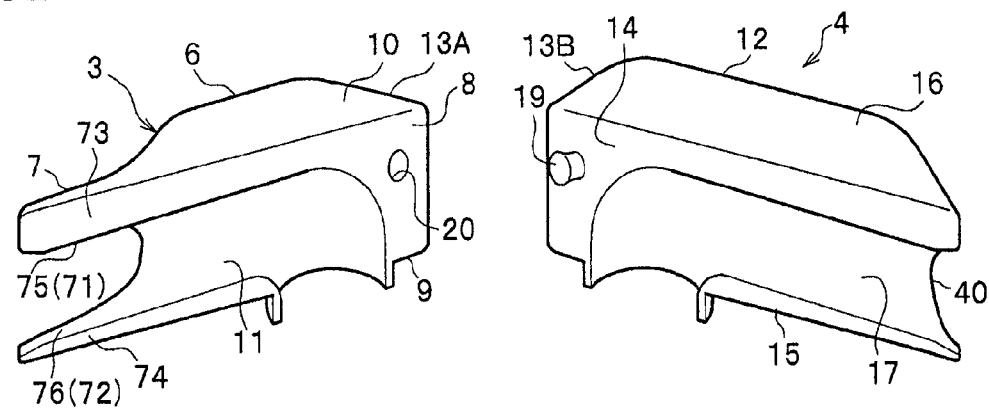
FIG. 5B is a perspective view showing a state before the first member and the second member are assembled and FIG. 5C is a plan view showing the state where the first member and the second member are assembled.
Figure 5C:
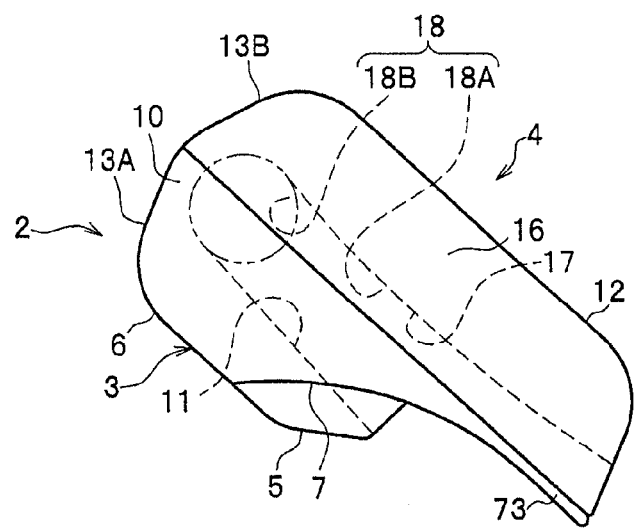

Hereinafter, the ball screw 1 will be explained in detail. In FIG. 3 and FIG. 4, the ball screw 1 includes the nut 21, the screw shaft 62 (FIG. 1) in which the nut 21 is inserted and the spiral groove 36 is formed at an outer peripheral surface, plural balls 41 (FIG. 2) rolling along the spiral groove 36 and an end deflector 2 attached to the nut 21. In the following explanation, a travelling direction of the balls 41 indicates a direction in which the balls 41 enter from spiral grooves 22 and 36 (FIG. 2) to the end deflector 2.

"Nut 21"

The nut 21 is a cylindrical member, including the spiral groove 22 housing the balls 41 with the spiral groove 36 of the screw shaft 62. A cross section of the spiral grooves 22 and 36 has, for example, a Gothic arc shape including groove bottom portions 34 and 37 at tips thereof respectively. A mountain part 35 of the spiral groove 22 and a mountain part 38 of the spiral groove 36 are apart from each other with a distance "s".

Returning to FIG. 4, a periphery of an end portion of the nut 21 is formed in a stepped shape as an annular inter end surface 23 formed around an edge of an opening into which the screw shaft 62 is inserted, a step wall surface 24 formed from an outer edge of the inner end surface 23 toward the outer side of an axis O direction of the screw shaft 62 and an annular outer end surface 25 formed from an outer end of the step wall surface 24 to a radially outward direction of the axis O are formed. In the step wall surface 24, a groove 26 for locking a snap ring 42 is formed in the step wall surface 24 over the entire periphery. The outer side of the axis O direction indicates the direction getting away from the center of the axis O direction of the nut 21 along the axis O direction, and an inner side of the axis O direction indicates the direction getting close to the center of the axis O direction of the nut 21.

A housing portion 27 which houses the end deflector 2 is formed by cutting respective parts of the outer end surface 25 and the inner end surface 23 toward the inner side of the axis O direction at the end portion of the nut 21. The housing portion 27 is demarcated by a first side wall surface 28 and a second side wall surface 29 extending from an inner peripheral face of the nut 21 toward an outer peripheral face side to face each other, a bottom wall surface 30 formed over an edge portion close to the outer peripheral face of the nut 21 in the first side wall surface 28 and an edge portion close to the outer peripheral face of the nut 21 in the second side wall surface 29 and an abutting surface 31 formed over respective edge portions close to the inner side of the axis O direction of the first side wall surface 28, the second side wall surface 29 and the bottom wall surface 30.

The first side wall surface 28, the second side wall surface 29 and the bottom wall surface 30 are formed along the axis O direction, and the abutting surface 31 is formed along a surface orthogonal to the axis O direction. The first side wall surface 28 and the second side wall surface 29 face each other, however, it is not necessary that they are parallel to each other. The second side wall surface 29 is formed so as to be connected to an end portion 22a of the spiral groove 22. An opening 33 of a circulation path 32 faces the abutting surface 31. The circulation path 32 is formed along the axis O direction in the nut 21, and the same opening 33 is formed also in an opposite end portion of the nut 21.

"End Deflector 2"

The end deflector 2 is a member having a function of rectifying the spiral movement of the balls 41 (FIG. 2) in the spiral grooves 22 and 36 and the movement in the axis O direction in the circulation path 32, that is, a function of changing the direction of the balls 41 in the spiral grooves 22, 36 and the circulation path 32.

The explanation will be made chiefly with reference to FIG. 4 and FIGS. 5A to 5C. A passage 18 through which the ball 41 passes is formed inside the end deflector 2. In the embodiment, the end deflector 2 is formed to be divided into a first member 3 provided with a passage with a semicircular shape in cross section (referred to as a first half-passage 11) communicating with the spiral groove 36 of the screw shaft 62 and a second member 4 provided with a passage with a semicircular shape in cross section (referred to as a second half-passage 17) communicating with the spiral groove 22 of the nut 21 chiefly from the viewpoint of formability of the passage 18. The material of the end deflector 2 is not particularly limited, and metal materials, synthetic resin materials and so on can be used. When the end deflector 2 is formed of, for example, a zinc material, parts can be formed by a die casting process.

The first member 3 includes a first side surface 6 formed along the first side wall surface 28 as an outer contour surface extending almost along the axis O direction, an outer surface 13A formed along the bottom wall surface 30, an inner surface 7 facing the screw shaft 62 and a dividing surface 8 which is a surface contacting the second member 4. An end surface of the first member 3 close to the inner side of the axis O direction is formed as an abutted surface 9 abutting on the abutting surface 31, and an end surface of the first member 3 close to the outer side of the axis O direction is formed as an end surface 10 pressed by the snap ring 42. In the dividing surface 8, the first half-passage 11 forming the half of the passage 18 of the balls 41 is formed. A hook portion 5 protruding in the radially inward direction of the axis O and positioned inside the spiral groove 36 of the screw shaft 62 is formed at part of the inner surface 7. The hook portion has an approximately semicircular shape with a size not interfering with the spiral groove 36.

The second member 4 includes a second side surface 12 formed along the second side wall surface 29 as an outer contour surface extending almost along the axis O direction, an outer surface 13B formed along the bottom wall surface 30 and a dividing surface 14 which is a surface contacting the first member 3. An end surface of the second member 4 close to the inner side of the axis O direction is formed as an abutted surface 15 abutting on the abutting surface 31, and an end surface of the second member 4 close to the outer side of the axis O direction is formed as an end surface 16 pressed by the snap ring 42. In the dividing surface 14, the second half-passage 17 forming the half of the passage 18 of the balls 41 is formed. A notch 40 is formed at a tip end of the second half-passage 17 so as to guide the balls 41 smoothly from the end portion 22a of the spiral groove 22.

An engaging projection portion 19 is formed in the dividing surface 14 of the second member 4 as well as an engaging concave portion 20 is formed in the dividing surface 8 of the first member 3. In the first member 3 and the second member 4, the dividing surfaces 8 and 14 contact each other as the engaging projection portion 19 is, for example, snap-engaged with the engaging concave portion 20, and both members are combined to thereby form the end deflector 2. The end surfaces 10 and 16 are connected so as to be flush with each other, and the abutted surfaces 9 and 15 are also connected so as to be flush with each other. As the first half-passage 11 and the second half-passage 17 are combined, the passage 18 including a first passage 18A communicating with the spiral grooves 22, 36 and a second passage 18B formed along the axis O direction so as to be turned by 90 degrees smoothly from the first passage 18A and communicating with the opening 33 of the circulation path 32 is formed inside the end deflector 2. The structure for combining the first member 3 with the second member 4 is not particularly limited to the engaging method using the engaging protrusion portion 19 and the engaging concave portion 20. It is not always necessary to provide the structure of combining the first member 3 with the second member 4.

In the above structure, when the balls 41 enter the end deflector 2 as shown in FIG. 6, the balls 41 go through
(1) a state of being sandwiched by the spiral groove 36 and the spiral groove 22
(2) a state of being sandwiched by the spiral groove 36 and the second half-passage 17 of the second member 4
(3) a state of being sandwiched by the first half-passage 11 of the first member 3 and the second half-passage 17 of the second member 4 in this order.

In the transition from (1) to (2), the second half-passage 17 of the second member 4 is allowed to communicate with the end portion 22a of the spiral groove 22 of the nut 21 smoothly without generating a gap or a step due to the notch 40 (FIG. 5), thereby moving the balls 41 smoothly. However, in the transition from (2) to (3), a gap "t" has to be set between the first member 3 of the end deflector 2 and the spiral groove 36 of the screw shaft 62 for avoiding the contact as the screw shaft 62 is a movable body with respect to the end deflector 2. Therefore, collision noise tends to be generated as the balls 41 collide with the hook portion 5 due to the existence of the gap "t" as described above.

"Ball Lifting Portions 71 and 72"

In view of the above problem, the end deflector 2 according to the present invention is provided with a pair of ball lifting portions 71 and 72 (FIG. 7 to FIG. 9) provided so as to interpose the width center of the spiral groove 36 of the screw shaft 62 between the pair of ball lifting portions 71 and 72. The pair of ball lifting portions 71 and 72 supports the balls 41 by two parts of the pair of ball lifting portions 71 and 72 being apart from each other in a width direction of the spiral groove 36 so as to interpose the width center of the spiral groove 36 between the two parts, thereby lifting the balls 41 from the spiral groove 36.

Figure 7:
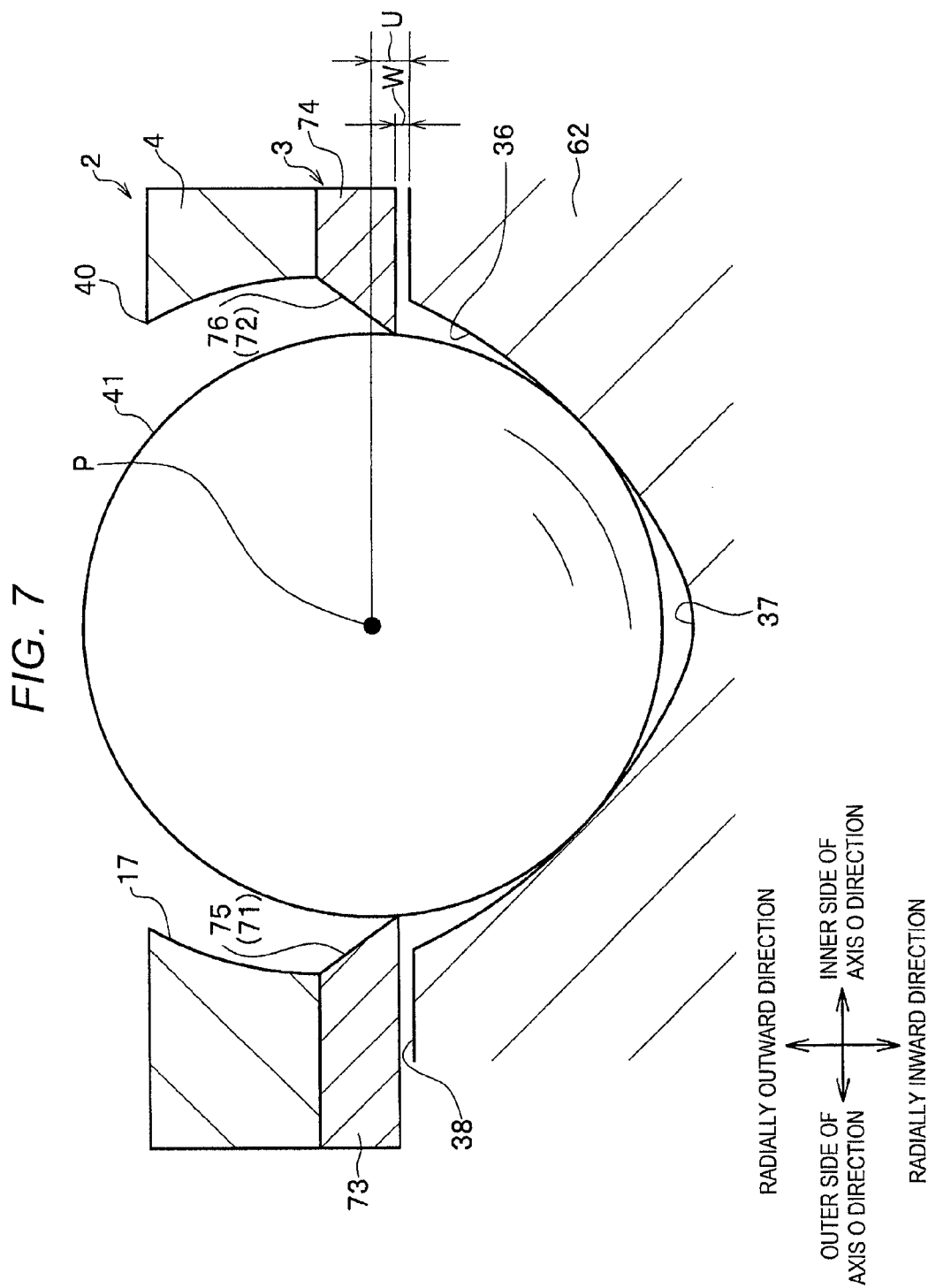
FIG. 7 is a cross sectional view of the spiral groove of the screw shaft and the end deflector.

In the embodiment, the ball lifting portions 71 and 72 are formed in the first member 3. As shown in FIG. 5 to FIG. 7, the first member 3 has a pair of thin plate portions 73 and 74 extending along the travelling direction of balls 41 between the second member 4 and the mountain part 38 of the screw shaft 62 and provided apart from each other in the width direction of the spiral groove 36 so as to interpose the width center of the spiral groove 36 of the screw shaft 62. An inclined surface 75 is formed on a side surface of the thin plate portion 73 which faces the thin plate portion 74, and an inclined portion 76 is formed on a side surface of the thin plate portion 74 which faces the thin plate portion 73. The inclined surfaces 75 and 76 are inclined to the width center side of the spiral groove 36 as the inclined surfaces 75 and 76 go to the radially inward direction of the screw shaft 62 and provided so that a separation distance L therebetween is narrowed as the inclined surfaces 75 and 76 go toward the travelling direction of the balls as can be seen from FIGS. 8A to 8C and FIG. 9. The inclined surfaces 75 and 76 configure the ball lifting portions 71 and 72. As can be seen from the above, the ball lifting portions 71 and 72 are positioned outward in the radial direction of the axis O with respect to the mountain part 38 of the spiral groove 36. Respective cross sectional views of FIG. 8A to 8C almost correspond to an A-A cross section, a B-B cross section and a C-C cross section shown in FIG. 6 and FIG. 9 respectively. In FIGS. 8A to 8C and FIG. 9, the inclined surfaces 75 and 76 are shown by stippling for clearly showing the state in which the inclined surfaces 75 and 76 are displaced so that the separation distance L therebetween is gradually narrowed.

The inclined surfaces 75 and 76 may have a curved surface shape extending along a spherical surface of the ball 41 and may have a flat surface shape. As shown in FIG. 7, a distance "w" between the mountain part 38 of the screw shaft 62 and the thin plate portions 73, 74 is set to be smaller than a distance "u" between the mountain part 38 of the screw shaft 62 and a center of the ball "p", and edges of the inclined surfaces 75 and 76 close to the radially inward direction are positioned in the radially inward direction with respect to the center of the ball "p". Accordingly, when the ball 41 comes close to the inclined surfaces 75 and 76, the inclined surfaces 75 and 76 contact the spherical surface at a lower part than the center "p" of the ball 41 to thereby lift the ball 41 from both sides, then, the ball 41 gradually rises as the separation distance L is narrowed toward the travelling direction.

"Operation"

When the ball 41 enters the end deflector 2 from the spiral grooves 22 and 36, the inclined surfaces 75 and 76 lift the ball 41 from both sides, and the balls 41 gradually rises as the separation distance L between the inclined surfaces 75 and 76 is narrowed toward the travelling direction as shown in FIG. 8A to 8C. Accordingly, the ball 41 enters the passage 18 inside the end deflector 2 without colliding with the tip of the hook portion 5.

When applying the structure of including the pair of ball lifting portions 71 and 72 as in the present invention, the impact generated when abutting on the ball lifting portions 71 and 72 is dispersed to two parts. Therefore, even when the collision noise is generated at the time of abutting on the ball lifting portions 71 and 72, the collision noise will be lower than that to be generated at the time of abutting on the hook portion 5 in related art. As the lifting portions 71 and 72 are positioned at approximately 180 degrees opposite positions so as to interpose the center "p" of the ball 41, a bound behavior of the ball 41 occurring when abutting on the lifting portion 71 and 72 can be suppressed.

Additionally, the ball lifting portions 71 and 72 according to the embodiment are positioned outward in the radial direction of the axis O with respect to the mountain part 38 of the spiral groove 36. In the structure of scooping the ball 41 by the hook portion 5 as in related art, it is necessary to set the gap "t" between the hook portion 5 and the spiral groove 36 for avoiding the contact, which may increase the collision angle with respect to the ball 41 (a crossing angle between the travelling direction of the ball 41 and a tangential direction in a collision part of the ball 41) and may increase the collision noise. On the other hand, when the ball lifting portions 71 and 72 are allowed to be positioned outward in the radial direction of the axis O with respect to the mountain part 38 of the spiral groove 36, the collision angle of the ball lifting portions 71 and 72 with respect to the ball 41 can be set to be extremely smaller without considering the contact with respect to the screw shaft 62 at the time of lifting the ball 41. That is, peripheries of tips of the ball lifting portions 71 and 72 can be positioned almost along the tangential direction of the spherical surface of the ball 41. Accordingly, the occurrence of collision noise can be almost eliminated.

When the ball lifting portions 71 and 72 are formed by the pair of inclined surfaces 75 and 76, each of which are is inclined to the width center side of the spiral groove 36 as each of which goes to the radially inward direction of the screw shaft 62 and which are provided so that the separation distance L between them is narrowed as the inclined surfaces 75 and 76 go toward the travelling direction of the balls, the ball lifting portions 71 and 72 can be formed in a simple structure, and the balls 41 can be lifted smoothly.

Additionally, when the first member 3 is provided with the pair of thin plate portions 73 and 74 and the inclined surfaces 75 and 76 are formed in the thin plate portion 73 and 74 as in the embodiment, the shape design of the end deflector 2 which is formed so as to be divided into the first member 3 and the second member 4 can be performed easily.

Modification Examples

Although the ball lifting portions 71 and 72 are formed in the first member 3 side in the above embodiment, the ball lifting portions 71 and 72 may be formed in the second member 4 side. The end deflector 2 may have a structure in which the entire part is integrally formed instead of the structure divided into the first member 3 and the second member 4. Furthermore, the hook portion 5 protruding inside the spiral groove 36 is not always necessary to be provided as long as the balls 41 can be smoothly guided to the passage 18 inside the end deflector 2 by the ball lifting portions 71 and 72.

What is claimed is:

1. A ball screw comprising:
a nut;
a screw shaft at which a spiral groove is formed at an outer peripheral surface of the screw shaft;
an end deflector attached to the nut;
plural balls rolling along the spiral groove; and
a pair of ball lifting portions provided at the end deflector so as to interpose a width center of the spiral groove between the pair of ball lifting portions,
wherein the pair of ball lifting portions supports the balls by a first part of one of the pair of ball lifting portions and a second part of other of the pair of ball lifting portions being apart from each other in a width direction of the spiral groove, and
wherein a distance between the first and second parts is configured to become narrower in a traveling direction of the balls so as to lift the balls from the spiral groove.

2. The ball screw according to claim 1,
wherein the pair of ball lifting portions is positioned outward in a radial direction of the screw shaft with respect to a mountain part of the spiral groove of the screw shaft.

3. The ball screw according to claim 1,
wherein the pair of ball lifting portions is formed by a pair of inclined surfaces, each of which is inclined to a width center side of the spiral groove as each of which goes to a radially inward direction of the screw shaft.

4. The ball screw according to claim 2,
wherein the pair of ball lifting portions is formed by a pair of inclined surfaces, each of which is inclined to a width center side of the spiral groove as each of which goes to a radially inward direction of the screw shaft.

5. The ball screw according to claim 3,
wherein the end deflector is formed to be divided into a first member provided with a passage having a semicircular shape in cross section communicating with the spiral groove of the screw shaft and a second member provided with a passage having a semicircular shape in cross section communicating with a spiral groove of the nut,
the first member has a pair of thin plate portions extending along the travelling direction of balls between the second member and the mountain part of the screw shaft and provided apart from each other in the width direction of the spiral groove so as to interpose the width center of the spiral groove of the screw shaft between the pair of thin plate portions, and
the inclined surfaces are formed on side surfaces of the respective thin plate portions facing each other.

6. The ball screw according to claim 4,
wherein the end deflector is formed to be divided into a first member provided with a passage having a semicircular shape in cross section communicating with the spiral groove of the screw shaft and a second member provided with a passage having a semicircular shape in cross section communicating with a spiral groove of the nut, the first member has a pair of thin plate portions extending along the travelling direction of balls between the second member and the mountain part of the screw shaft and provided apart from each other in the width direction of the spiral groove so as to interpose the width center of the spiral groove of the screw shaft between the pair of thin plate portions, and the inclined surfaces are formed on side surfaces of the respective thin plate portions facing each other.

7. A steering apparatus comprising:

the ball screw according to claim 1;

a motor rotating the nut; and a steered shaft moving with the screw shaft and turning steered wheels.

8. The ball screw according to claim 1, wherein the pair of ball lifting portions are provided in such a manner that the balls are lifted outward in a radial direction of the screw shaft when the balls enter the end deflector.

\* \* \* \* \*